(12) United States Patent
Cucu-Grosjean et al.

(10) Patent No.: US 11,120,175 B2
(45) Date of Patent: Sep. 14, 2021

(54) SIMULATION DEVICE

(71) Applicant: Inria Institut National De Recherche En Informatique Et En Automatique, Le Chesnay (FR)

(72) Inventors: Liliana Cucu-Grosjean, Versailles (FR); Adriana Gogonel, Les Plessis Robinson (FR)

(73) Assignee: Inria Institut National De Recherche En Informatique Et En Automatique, LeChesnay (FR)

( * ) Notice: Subject to any disclaimer, the term of this patent is extended or adjusted under 35 U.S.C. 154(b) by 701 days.

(21) Appl. No.: 15/555,511

(22) PCT Filed: Mar. 4, 2016

(86) PCT No.: PCT/FR2016/050504
§ 371 (c)(1),
(2) Date: Jan. 4, 2018

(87) PCT Pub. No.: WO2016/139436
PCT Pub. Date: Sep. 9, 2016

(65) Prior Publication Data
US 2018/0210978 A1     Jul. 26, 2018

(30) Foreign Application Priority Data

Mar. 4, 2015  (FR) ...................... 1551828

(51) Int. Cl.
*G06F 17/10*       (2006.01)
*G06F 30/20*       (2020.01)
(Continued)

(52) U.S. Cl.
CPC .......... *G06F 30/20* (2020.01); *G06F 11/3419* (2013.01); *G06F 11/3452* (2013.01);
(Continued)

(58) Field of Classification Search
CPC .. G06F 30/20; G06F 11/3419; G06F 11/3452; G06F 17/18
(Continued)

(56) References Cited

U.S. PATENT DOCUMENTS

2013/0110399 A1* 5/2013 Moss ...................... G01W 1/10
702/3
2014/0149325 A1* 5/2014 Clifton ................. A61B 5/0205
706/12

OTHER PUBLICATIONS

Yue, Lu, et al., "A Statistical Response-Time Analysis of Real Time Embedded Systems", Real-Time Systems Symposium (RTSS), IEEE 33rd, Dec. 4, 2012, pp. 351-362.
(Continued)

*Primary Examiner* — Andre Pierre Louis
(74) *Attorney, Agent, or Firm* — Maynard Cooper & Gale, P. C.; Brian T. Sattizahn

(57) ABSTRACT

The invention relates to a simulation device including: —a memory (2) receiving a dataset representing parameter measurements; —a selector (4) capable of producing a set of sub-datasets from the dataset, each sub-dataset from said set including consecutive data from the dataset, the number of which is a whole integer received as a variable by the selector (4); —an evaluator (6) capable of calculating, from a value set defining a curve, a form factor indicating a probability of correspondence between the curve defined by the value set and a Gumbel curve; and—a driver (8) arranged so as to call the selector (4) with a plurality of numbers for generating a plurality of sub-dataset sets, select the data, the measurement value of which is highest, within each sub-dataset from each sub-dataset set, create a plurality of curve datasets by combining the data selected from each set, call the evaluator (6) with the plurality of curve datasets, and select the curve dataset for which the form factor indicates the highest probability.

10 Claims, 1 Drawing Sheet

(51) Int. Cl.
*G06F 11/34* (2006.01)
*G06F 17/18* (2006.01)
G06F 111/08 (2020.01)
G06F 111/10 (2020.01)

(52) U.S. Cl.
CPC .......... *G06F 17/18* (2013.01); *G06F 2111/08* (2020.01); *G06F 2111/10* (2020.01)

(58) Field of Classification Search
USPC .......................................................... 703/2
See application file for complete search history.

(56) References Cited

OTHER PUBLICATIONS

Liu, Meng, et al., "Applying the Peak Over Thresholds Method on Worst-Case Response Time Analysis of Complex Real-Time Systems", Proceedings of the 12th IEEE International Conference on Embedded and Real-Time Computing Systems and Applications, Aug. 19, 2013, pp. 22-31.

Hansen, J, et al., "Statistically-Based Wcet Estimation and Validation", Worst-Case Execution Time Analysis: Proceedings of the 9th International Workshop WCET 2009, Jan. 1, 2009, pp. 130-140.

* cited by examiner

SIMULATION DEVICE

The invention relates to the field of the design of onboard systems and the simulation of their operation.

More particularly, the invention is applicable to the design of critical onboard systems. Critical onboard systems have the particularity of being designed in such a manner as not to experience any fault and/or so as to exhibit a very high tolerance in the case where a fault occurs. For example, the resources of these systems are doubled, tripled, or even decupled, in such a manner as to ensure a redundancy in the case of a failure of one of the elements, and also in order to ensure that all the calculations that these systems are responsible for performing are finished within the desired time.

Historically, the progress in technology has been sufficient to satisfy the growing complexification of these systems. In other words, the increase in power available for the processors of onboard systems made the design simple: it sufficed to oversize the controller with a large coefficient in order to guarantee the integrity of all the onboard systems, whether this be for avionics, aerospace, automobile or railroad transport.

In recent years, two combined effects have changed this paradigm.

On the one hand, although the powers of the controllers continue to regularly grow, this growth has slowed and is tending to slow even more as the etch resolution increases. This is accentuated by the fact that the electrical power consumption and the heat generated are criteria that have become crucial, whereas this was not the case for the old controllers.

On the other hand, significant progress has been made in terms of physical modeling and of practical application of onboard systems, and the applications of the latter require a processing power which has greatly increased, and which are tending to grow faster than the growth in the power of the processors.

There therefore exists a need to produce a device which allows the extent of the requirements in processing power of onboard systems to be better determined.

For this purpose, the invention provides a simulation device comprising a memory receiving a dataset representing measurements of a parameter, a selector capable of producing an assembly of data subsets starting from the dataset, each data subset of this assembly comprising successive data from the dataset whose number is a natural integer received as a variable by the selector, an evaluator capable, starting from the assembly of values defining a curve, of calculating a form factor indicating a probability of correspondence between the curve defined by the assembly of values and a Gumbel curve.

The device also comprises a controller configured for:
calling up the selector with a plurality of numbers for generating a plurality of assemblies of data subsets,
within each data subset of each assembly of data subsets, selecting the data whose measurement value is the largest, and creating a plurality of curve datasets by associating the data selected from each assembly,
calling up the evaluator with the plurality of curve datasets, and selecting the curve dataset whose form factor indicates the highest probability.

This device is advantageous because it allows a Gumbel curve to be determined which closely approximates the distribution law of the dataset of the memory.

In various particular embodiments, the device exhibits one or a combination of several of the following features:

the controller is configured for determining a size representing the number of measurements in the dataset, and for calling up the selector with a plurality of numbers of the type $10*k$, where k is a natural integer in the range between 1 and the integer part of the size divided by forty, the evaluator is furthermore capable of calculating a scale factor and a localization factor, the controller is configured for calculating an extremum function corresponding to the inverse probability of the distribution function extracted from a Gumbel curve defined by the form factor corresponding to the set of curves selected and by the associated scale factor and localization factor, the controller is furthermore configured for determining a probability based on a value received at the input or a value based on a probability received at the input using the extremum function, the device may furthermore comprise:
an estimator capable of calculating a value representative of the expectation that a measurement from the dataset is greater than a value received at the input,
a sorter capable, starting from a dataset representing measurements of a parameter and from a value received at the input, of generating a data subset extracted from the dataset received at the input and whose associated measurements are higher than the value received at the input,
a second evaluator capable, starting from a data subset defining a distribution, of calculating a form factor indicating a probability of correspondence between the distribution defined by the data subset and a generalized Pareto distribution, the controller being configured for browsing the dataset by increasing value of the associated measurements, each time for calling up the sorter with the dataset and the value, for calling up the estimator with the resulting data subset and the value for calculating a plurality of expectation values, for analyzing the plurality of expectation values and determining a stopping measurement from the dataset starting from which the curve formed by the plurality of expectation values exhibits an inflexion, for browsing the dataset by increasing value of the associated measurements starting from the value associated with the stopping measurement, each time for calling up the sorter with the dataset and the value, for calling up the second evaluator with the resulting plurality of data subsets, and for selecting the data subset whose form factor indicates the highest probability, the second evaluator is furthermore capable of calculating a scale factor, the controller is configured for calculating a function corresponding to the inverse probability of the distribution function extracted from a Gumbel curve defined by the form factor corresponding to the data subset selected, by the associated scale factor, and by a localization factor defined by the stopping measurement, the controller is furthermore configured for determining a probability based on a value received at the input or a value based on a probability received at the input using the extremum function, and the controller is furthermore configured for returning the greatest value or the highest probability determined by each extremum function.

Other features and advantages of the invention will become apparent upon reading the description that follows, taken from examples presented by way of illustration and that are non-limiting, illustrated by drawings in which.

Figure 1:
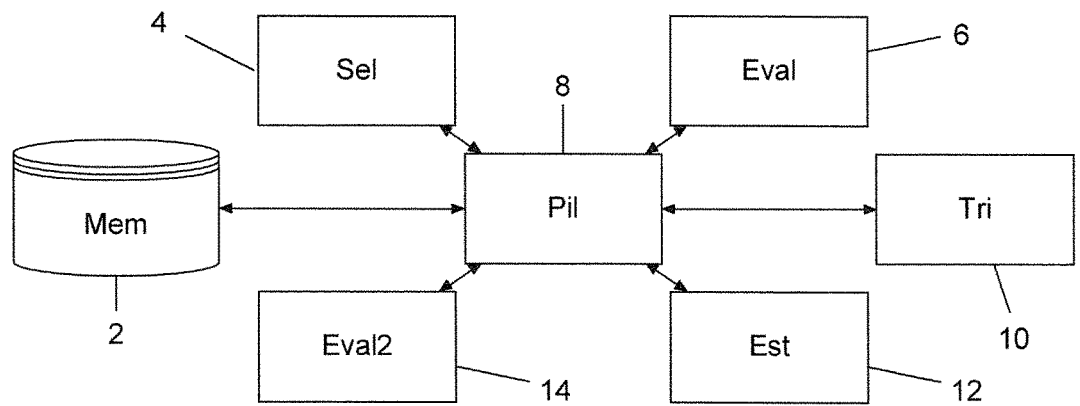
FIG. 1 shows a generic diagram of a device according to the invention.

The nature of the present description is that it involves elements that may be protected by copyright. The owner of the rights does not object to the exact reproduction by anyone of the present patent document or of its description, such as it appears in official documents. For anything else, they reserve the entirety of their rights.

The drawings and the description hereinafter contain, for the most part, elements whose nature is well-defined. They will therefore be able to be used not only for a better understanding of the present invention, but also to contribute to its definition, where appropriate.

In order to guarantee the integrity of an onboard system, it should be guaranteed that the latter will perform the tasks and/or calculations requested of it in a prescribed maximum time. For this purpose, the applicant has discovered that the Extreme Values Theory (or EVT) could be useful. The reason for this is that the purpose of this theory is to allow the study of the behavior of the upper and lower parts of a distribution law whose distribution function is unknown. The invention is therefore aimed at using the EVT to determine the extreme behavior of a controller in relation to a given task, and to deduce from this the appropriate dimensioning of an onboard system.

Some studies have already been undertaken in this area, in other words the estimation of a (worst-case) execution time of a program or of a task. The most significant studies have been carried out by Edgar et al ("*Statistical analysis of WCET for scheduling*", 22nd IEEE Real-Time Systems Symposium (RTSS01), 2001), Hansen et al ("*Statistical-based WCET estimation and validation*", 9th International Workshop on Worst-Case Execution Time (WCET) Analysis, 2009), Y Lu et al ("*A new way about using statistical analysis of worst-case execution times*", ACM SIGBED Review, 2011), and Cucu-Grosjean et al ("*Measurement-based probabilistic timing analysis for multi-path programs*", 24th Euromicro Conference on Real-time Systems (ECRTS), 2012).

These studies are based on a version called GEV (Generalized Extreme Value) of the EVT. This version of the EVT is aimed at approximating the upper part of a distribution law by means of a family of curves called Gumbel curves. The whole difficulty lies in determining, starting from a given distribution, which of the Gumbel curves corresponds to this distribution.

Hithertofore, none of the solutions cited hereinabove has really been satisfactory, nor do they guarantee any certainty with regard to the quality of the correspondence between the Gumbel curve determined and the distribution law.

Another version of the EVT exists. This version is called GPD (generalized Pareto distribution). Here again, the idea is to associate a given distribution law whose distribution function is unknown with a Pareto curve defined by the GPD theory. There does not exist hithertofore any document which explains how to choose a GPD curve starting from a given distribution.

Beyond the absence of a satisfactory solution for modeling an unknown distribution in a sufficiently certain manner by means of the GEV version or of the GPD version of the EVT, no document exists which combines these two versions together in order to make such a determination.

The device of the invention, in its multiple variants, is intended to fill these deficiencies.

FIG. 1 shows a generic diagram of a simulation device according to the invention. The device comprises a memory 2, a selector 4, an evaluator 6, a controller 8, a sorter 10, an estimator 12 and a second evaluator 14.

In the framework of the invention, the memory 2 may be any type of data storage designed to receive digital data: hard disk, flash memory 'hard disk' (SSD for Solid-State Drive), flash memory under any form, RAM memory, magnetic disk, locally distributed storage or in the cloud, etc. The data calculated by the device may be stored on any type of memory similar to the memory 2, or on the latter. This data may be deleted after the device has carried out its tasks or conserved.

The 5 functional units (the selector 4, the evaluator 6, the controller 8, the sorter 10, the estimator 12 and the second evaluator 14) may be grouped within the same package, in the form of one or more controllers or application specific integrated circuits in order to carry out their functions, or else in the form of computer code executed on one or more data processors connected together for the implementation of the device, or in any form intermediate between these types of implementation.

The memory 2 receives a dataset representing measurements of a parameter whose distribution law it is sought to evaluate. In the example described hereinabove, this dataset comprises various execution times for a given task by a given controller, and the aim is to determine what is the "worst-case" time that this controller could take to execute this task. In other variants, the data may represent another type of measurement parameter of which an extreme value is sought.

The function of the selector 4 is to re-arrange the data from the dataset as a function of an input parameter. More precisely, the selector 4 receives a non-zero natural integer as parameter and accesses the dataset stored in the memory 2 so as to produce at the output an assembly of data subsets which each contain a number of data values equal to the parameter. For example, if the parameter has a value of 10 and if the dataset comprises 100 measurements, the selector 4 will return an assembly of 10 data subsets each comprising 10 measurements. The selector 4 may be implemented in many different ways, and may for example be coded in the form of a data processing function which divides up the dataset into segments of equal sizes. The data subsets may subsequently be used to define a curve which is used in the GEV version of the EVT.

Where the number of measurements in the dataset is not divisible by 10, the selector 4 operates in an identical fashion up to the last block, which is processed with a smaller number of data.

The function of the evaluator 6 is to determine of one or more parameters of a Gumbel curve starting from a dataset at the input. These parameters include a form factor (commonly denoted by the Greek letter Xi in the EVT), a scale factor corresponding to the variance of the Gumbel law (commonly denoted by the Greek letter Sigma in the EVT) and a localization factor corresponding to the mean of the Gumbel law (commonly denoted by the Greek letter Mu in the EVT). In the example described here, the evaluator 6 is a function named gev.fit( ) which is available in the packet "ismev" of the R programming language (programming language dedicated to statistics). In the example described here, the function gev.fit( ) determines the form factor, the scale factor and the localization factor by estimating them by the method of the maximum likelihood. As a variant, the form factor, the scale factor and the localization factor could be determined by the method of moments.

The second evaluator 14 is similar to the evaluator 6, except that it determines a Pareto distribution instead of a Gumbel curve. The parameters produced include a form factor (commonly denoted by the Greek letter Xi in the EVT), a scale factor (commonly denoted by the Greek letter Sigma in the EVT) and a localization factor (commonly denoted by the Greek letter Mu in the EVT). In the example described here, the second evaluator 14 is a function named gpd.fit( ) which is available in the packet "ismev" of the R programming language. In the example described here, the function gpd.fit( ) estimates the scale factor and the localization factor by estimating them using the method of the maximum likelihood. The localization factor is determined upstream as will be seen hereinbelow. As a variant, the form factor and the scale factor could be determined by the method of moments.

The function of the sorter 10 is to produce data subsets whose associated measurement values are all higher than those of a reference value received at the input. More precisely, the sorter 10 receives a value as parameter and a dataset. As will be seen in the following, it is always the dataset from the memory 2 which is used as input dataset. The latter could therefore be denoted as a global variable, and the sorter 10 could only receive the value as parameter. Thus, if the value is 100, the sorter 10 will return all the data from the dataset whose value is higher than 100. As a variant, the sorter 10 could also receive a non-zero natural integer which indicates the index of a value from the dataset sorted by increasing values. Thus, the sorter 10 would return the data subset which contains all the data higher than the measurement value denoted by the index received as parameter.

The function of the estimator 12 is to determine the mathematical expectation that a measurement from the dataset is higher than a measurement chosen from the dataset. As will be seen, the controller 8 runs through the dataset in order to get the estimator 12 to calculate this expectation by increasing value of the dataset, and to calculate a list of corresponding expectation values. This list of expectation values describes a curve which is used in the GPD version of the EVT.

The function of the controller 8 is to call up the selector 4, the evaluator 6, the sorter 10, the estimator 12 and the second evaluator 14 in order to implement the GEV version, and where necessary the GPD version, of the EVT in order to determine the function of the EVT which best approximates the distribution of the dataset received in the memory 2. This function of the EVT, in return, allows the determination of the "worst-case" execution time by the processor of the task which was used to generate the dataset. This execution time may then be used to improve the dimensioning of an onboard system using this processor and implementing this task. As will be seen in the following, the device can even calculate, depending on the variant, the precision with which the function of the EVT approximates the dataset.

As a variant, the device of the invention may be used in applications other than the determination of "worst-case" time for a task by a processor, given that its function is to study the taking of extreme values by a physical parameter. Just like the others elements, the controller 8 may be implemented in many different ways and may, for example, be coded in the form of a data processing function.

Figure 2:
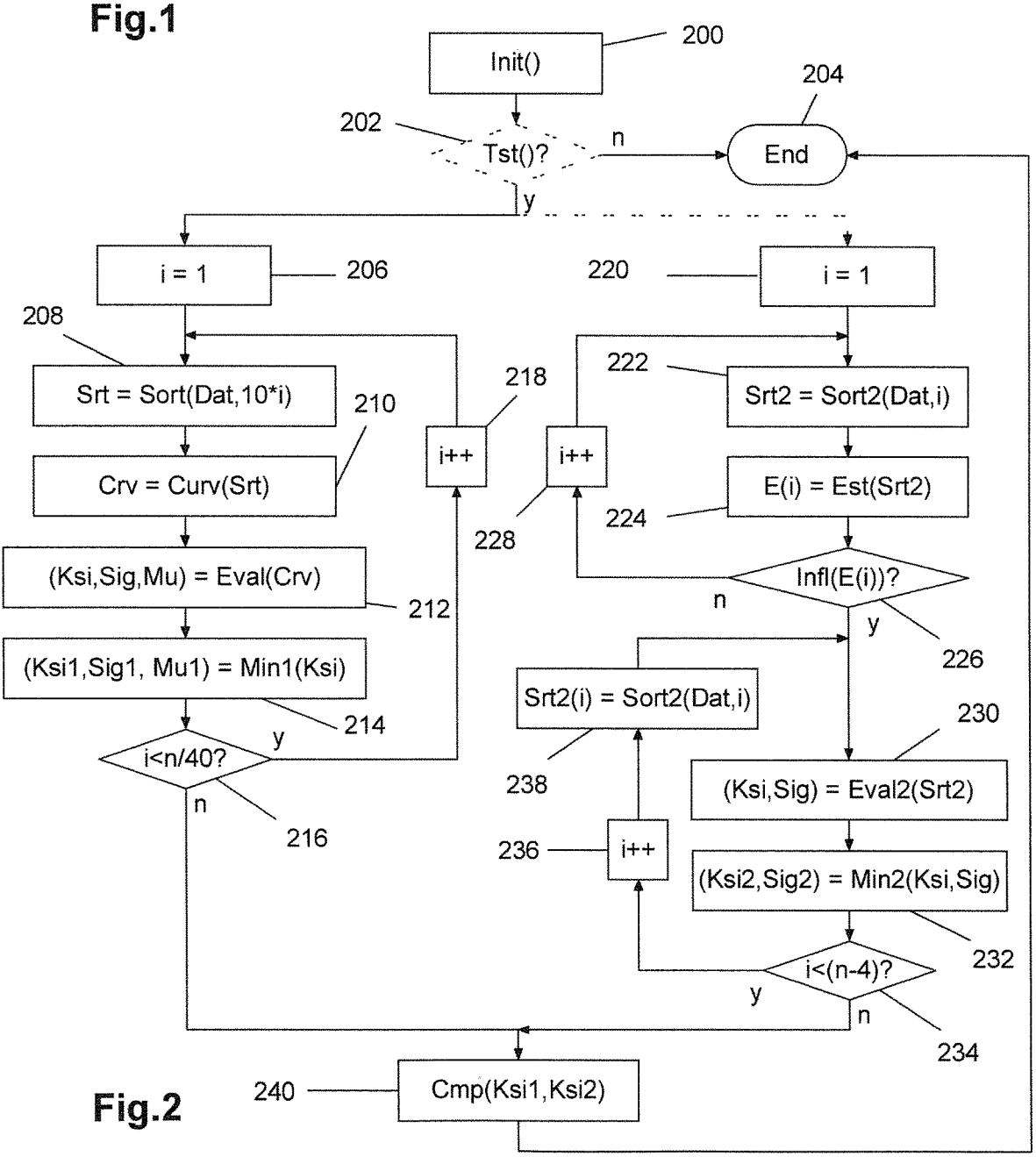
FIG. 2 shows one exemplary embodiment of a function implemented by the device in FIG. 1.

FIG. 2 shows one example of a function implemented by the controller 8.

All of the code executed by the function in FIG. 2 is, in the example described here, coded in R language. Other programming languages could be used.

The function begins with an operation 200 by the execution of a function Ink). This function initializes the device and ensures the presence of the dataset in the memory 2.

Subsequently, in an optional operation 202, a test is performed by a function Tst( ) The function Tst( ) implements a test E.T and I.I.D which allows it to be determined whether the distribution defined by the dataset received in the memory 2 may be approximated by the EVT or not. The article by Garrido et al "*Modelling of rare events and estimation of extreme quantiles, model selecting methods for distribution tails*" PhD. Work, 2002 describes this test. If this is not the case, then the function ends at 204, with an indication that the dataset cannot be approximated by the EVT.

Otherwise, the execution of the function continues in two separate branches. The first branch, on the left in FIG. 2, is used to perform a simulation by the GEV version of the EVT, and the second branch, on the right in FIG. 2, is used to perform a simulation by the GPD version of the EVT.

The first branch begins, in an operation 206, by the initialization at 1 of an index i. This index is used to define several sizes for dividing up the dataset by the selector 4, in order to determine several curves that will be approximated.

Subsequently, a loop begins in which the selector 4 is called up in an operation 208 with the execution of a function Sort( ) The function Sort( ) receives the dataset Dat, received in the memory 2, and the index i multiplied by 10 as parameters. As it is always the dataset Dat from the memory 2 which is used as input dataset, the latter could therefore be denoted as a global variable in the function Sort( ) and the selector 4 could only receive the index i multiplied by 10 as parameter. As described above, the function Sort( ) divides up the dataset Dat into an assembly of datasets Srt which each contain 10*i data values.

Subsequently, in an operation 210, the controller 8 executes a function Curv( ) which will calculate curve data based on the assembly of data subsets Srt calculated at the operation 208. For this purpose, within each data subset of the assembly Srt, only the maximum value is kept, and the resulting values together define curve data Crv. For example, for the index i equal to 1, the dataset Dat has been divided up into subsets of 10 values. With the execution of the function Curv( ) only the largest of the 10 values of the data from each subset of 10 data values is conserved, in order to form the data Crv.

Thus, the increase in the index i by increment of 10 allows, by the combination of the operations 208 and 210, to "cut up" the dataset Dat into segments of variable thickness so as to only retain the extrema of these segments, and the variation of the size of the segments enables the subdivision which allows the most extrema to be discovered to be found.

Subsequently, in an operation 214, the evaluator 6 is called with the execution of a function Eval( ) which receives the curve data Cry as parameter. As described above, in the example described here, the function Eval( ) executes the function gev_fit( ) from the packet "ismev" of the R programming language. At the output of the function Eval( ) the three factors Xi, Sig and Mu for the current index i are returned. The factor Xi denotes the form factor of the Gumbel curve associated with the distribution defined by the curve data Crv, the factor Sig denotes the scale factor of this same Gumbel curve, and the factor Mu denotes the localization factor. The function Eval( ) may also calculate a value referred to as convergence value which yields an index of the reliability of the estimation carried out. Indeed, since the factors Xi, Sig and Mu are determined by the method of the maximum likelihood, the convergence value allows it to be indicated whether the estimation is reliable or not.

The form factor Xi is subsequently compared with the minimum form factor Xi1 in an operation 214 with the execution of a function Min1( ) The function Min1( ) returns the triplet of factors (Xi1,Sig1,Mu1) previously calculated if Xi is greater than Xi1, and returns (Xi,Sig,Mu) as a new triplet (Xi1,Sig1,Mu1) otherwise. Thus, as the index i is incremented, the triplet (Xi1,Sig1,Mu1) which is calculated represents the curve whose form factor Xi is the smallest from amongst all the curves Cry generated by the operations 208 and 210. According to the GEV version of the EVT, this curve, whose form factor is the smallest, represents the Gumbel curve which has the highest probability of representing the distribution of the dataset Dat.

Lastly, in an operation 216, it is tested whether the index i is less than n/40 where n is the number of data in the dataset Dat. If i is equal to n/40, then the assembly Srt comprises 4 data subsets, and the value of n/40 allows it to be ensured that the dataset Cry will comprise at least 4 points. If this is the case, then the index i is incremented in an operation 218, and the loop continues at 208. Otherwise, the simulation by the GEV version of the EVT is terminated, and the Gumbel curve which is determined as approximating the dataset is defined by the form factor and the scale factor, Ks1 and Sig1, which have been retained after the operation 216, together with their corresponding localization factor which has been determined with the function of the operation 212.

As a variant, the first branch could be carried out by taking the calculation of the triplet (Xi1,Sig1,Mu1) out of the loop. In addition, the function Eval( ) could only send back the form factor Xi which is the only parameter needed to identify the curve data Cry (or the corresponding iteration index) which represent the best subdivision of the dataset Dat for determining the Gumbel curve which corresponds to the dataset Dat.

The second branch begins, in a first operation, by the initialization to 1 of an index i in an operation 220. The index i is used to run through the dataset Dat applying a simulation adapted to the GPD version of the EVT.

The second branch comprises two loops. The first loop is used to determine a starting index for the second loop, and the second loop determines a Pareto distribution which best corresponds to the dataset Dat.

The second loop begins, in an operation 222, by calling up the sorter 10 with the call up of a function Sort2( ) The function Sort2( ) receives as parameter the dataset Dat received in the memory 2, and the current index i. As has been seen above, since the dataset Dat is systematically called up as variable, it could be passed as global variable, and the function Sort2( ) could only receive the index i as parameter. In a first step, the function Sort2( ) determines, within the dataset Dat, reference data whose measurement value has the index i as rank when the data of the dataset Dat are sorted by increasing measurement value. In a second step, the function Sort2( ) selects, within the dataset Dat, all the data whose measurement values are greater than the measurement value of the reference data in a data subset Srt2. The function Sort2( ) may be programmed in many different ways, with or without prior sorting of the dataset Dat, by directly passing the value of the reference data, etc.

Subsequently, the loop continues in an operation 224 by calling up the estimator 12 that executes a function Est( ) which receives the data subset Srt2. As described above, the function Est( ) calculates the expectation of the data subset Srt2, in other words the expectation that data from the dataset Dat exhibits a measurement value greater than the measurement value of the reference data for the instance i of the first loop. This may be carried out with any conventional function for calculation of the mathematical expectation, and the result is stored in a table E[ ] which receives all the expectation values, at the index i.

Finally, the first loop continues with a test Infl( ) in an operation 226. This test is aimed at determining whether the expectation curve defined by the values in the table E[ ] is substantially linear, or if the expectation E[ ] exhibits an inflexion. Indeed, the GPD version of the EVT teaches that the distribution allowing the Pareto distribution to be determined is contained in the part of the expectation curve which is not linear. The test Infl( ) may be carried out automatically, for example by calculating the first or second derivative of the expectation curve at each iteration and by determining an inflexion whenever the first derivative is no longer constant or when the second derivative is non-zero, or else manually by graphical representation of the expectation curve on a display, and input of a decision to stop or otherwise. If it is determined there is no inflexion, then the first loop continues, with the incrementation of the index i in an operation 228, then the repetition of the loop with the operation 222.

The first loop allows the index of the data, whose measurement value indicates the inflexion of the expectation curve (also called stopping measurement), to be determined as fast as possible. The first loop described here does not run through the whole dataset Dat: it stops as soon as an inflexion is detected. A certain tolerance could be provided for the detection of the stopping measurement, in order to avoid stopping "too early" in a local minimum. The stopping measurement which is thus determined defines the value of the localization factor for the Gumbel curve which will be determined at the end of the second loop.

As a variant, the first loop could run through all the data of the dataset in order to establish a complete expectation curve, and thus to take a more sure decision on the stopping measurement.

Once the stopping measurement has been determined, the second loop begins. It is fairly similar to the loop of the first branch. Thus, the dataset Dat is run through starting from the stopping measurement, Pareto distributions are calculated for a plurality of data subsets, and the distribution whose form factor is the smallest is chosen.

Thus, in an operation 230, the second evaluator 14 is called for executing a function Eval2( ) which receives the data subset Srt2 as parameter. This function is similar in principle to the function Eval( ) except for the detail that it is adapted to the GPD version of the EVT. As for the operation 212, the function Eval2( ) returns a pair (Xi,Sig). Here, the function Eval2( ) does not return a localization factor because it has been determined with the operation 226. The function Eval2( ) can also calculate a value referred to as convergence value which gives an index of the reliability of the estimation carried out. Indeed, since the factors Xi, Sig and Mu are determined by the method of the maximum likelihood, the convergence value allows it to be indicated whether the estimation is reliable or not.

Subsequently, in an operation 232, the pair (Xi,Sig) is compared to a pair (Xi2,Sig2) with the execution of a function Min2( ) The function Min2( ) returns the pair (Xi2,Sig2) calculated previously if Xi is greater than Xi2, and returns (Xi,Sig) as a new pair (Xi2,Sig2) otherwise. Thus, as the index i is incremented, the pair (Xi2,Sig2) that is calculated represents the curve whose form factor Xi is the smallest from amongst all the data subsets Srt2. According to the GPD version of the EVT, this distribution, whose form factor is the smallest, represents the Pareto distribution which has the highest probability of representing the distribution of the dataset Dat.

Subsequently, in an operation 234, a test determines whether the index i is less than the number n of data in the set minus 4. This test allows it to be guaranteed that the data subset Srt2 used for determining the Pareto distribution, evaluated in the operation 230, contains at least 4 points.

If this is the case, the second loop continues with the incrementation of the index i, in an operation 236, and the calculation of the data subset Srt2 for this new index i with the call up of the sorter 10 in an operation 238 identical to the operation 222. In the example described here, the operation 238 is disposed at this location because, when the first execution of the second loop was carried out, the data subset Srt2 for the stopping measurement had already been determined, and that it was not therefore necessary to redo it. Nevertheless, the operation 238 could be placed at the head of the second loop, and the data subset Srt2 be determined once again.

As a variant, the first branch could be carried out by removing the calculation of the pair (Xi2,Sig2) from the loop. Moreover, the function Eval2( ) could also calculate the localization factor of the Pareto distribution, or conversely only return the form factor Xi which is the only parameter needed to identify the data subset Srt2 (or the corresponding iteration index) which represents the best subdivision of the dataset Dat for determining the Pareto distribution which corresponds to the dataset Dat.

The first branch and the second branch may be carried out in series or in parallel. Similarly, the calculations within these branches could be serialized or performed in parallel, where possible.

The second branch is, in the example described here, optional (hence the dashed line arrow between the test of the operation 202 and the first operation 220 of the second branch): the device can calculate the Gumbel curve according to the first branch only.

Nevertheless, the applicant has discovered that the execution of the two branches could be very advantageous. Indeed, the applicant has discovered that by combining the determination by the GEV and GPD versions of the EVT, it is possible not only to determine the Gumbel curve or Pareto distribution which best approximates the distribution of the dataset Dat received in the memory 2, but it is also possible to determine the absolute precision with which the latter is approximated.

Thus, when the first branch and the second branch are executed, a function Cmp( ) is executed in a last operation 240. The function Cmp( ) allows the two Gumbel curves, which have been determined by the preceding calculations, to be used in order to simulate the behavior sought.

Subsequently, the function Cmp( ) determines the distribution function from the two Gumbel curves determined for the GEV version, on the one hand, and for the GPD version on the other. Subsequently, the function Cmp( ) defines, for each of the GEV version and of the GPD version, an extremum function which represents the inverse probability of the distribution function (in other words defined by g=1-f, where f is the distribution function).

Thus, if what is sought is to know the "worst-case" value for a given probability, then the function Cmp( ) determines, for each extremum function, the extreme value which corresponds to the probability received as variable. Lastly, the function Cmp( ) returns the highest value. Thus, the function Cmp( ) returns the most conservative value while at the same time being sure of having converged by using both the GEV version and the GPD version of the EVT.

As a variant, if it is, on the contrary, a probability that is sought for a given extreme value, the function Cmp( ) determines, for each extremum function the probability that corresponds to the extreme value supplied at the input. Here again, the highest probability is returned in order to be as conservative as possible.

In yet another variant, the function Cmp( ) may return a function which corresponds to a composition between the extremum function of the distribution function extracted from the GEV version and that extracted from the GPD version. Indeed, as it is desired to return a conservative value, the function Cmp( ) calculates the distribution function for the GEV version and for the GPD version, extracts each respective extremum function from them, and defines a new function whose value for each point is defined as the maximum of these inverse functions. Thus, it will be possible to use this conservative function at leisure.

In the above, the determinations have been described with reference to a form factor whose lowest value indicates the highest probability of correspondence with the GEV and/or the GPD. The evaluation functions could be designed to produce indicators other than the form factor, for which it is on the contrary a highest value that indicates the highest probability, or the fact of approaching a reference value. These variants do of course still come within the scope of the claims.

The invention also relates to a computer program product configured, when it is executed, for implementing the device and/or the method described hereinabove and as claimed in the claims.

The invention claimed is:

1. A simulation device to simulate extreme values of an execution time by a processor of an embedded system, the device comprising:
 a memory receiving a dataset representing measurements of execution times of a task by a processor of an embedded system,
 a selector to produce an assembly of data subsets starting from the dataset, each data subset of the assembly of data subsets comprising successive data values from the dataset whose number is a natural integer received as a variable input by the selector,
 an evaluator to calculate, based on a set of values defining a curve, a form factor indicating a probability of correspondence between the curve defined by the set of values and a Gumbel curve, and
 a controller in communication with the selector and the evaluator,
  the controller provides the selector with a variable input parameter a plurality of times, wherein the selector generates, for each time of the plurality of times, an assembly of data subsets from the dataset based on the input parameter,
  the controller selects, for each time of the plurality of times, a data value from each data subset of the assembly of data subsets having a greatest measurement value, and creates, for each time of the plurality of times, a curve dataset by associating the data value selected from each data subset of the assembly of data subsets to form a plurality of curve datasets,
  the controller provides the evaluator with the plurality of curve datasets, wherein the evaluator selects the curve dataset from the plurality of curve datasets whose form factor indicates a highest probability of correspondence between the curve dataset and the Gumbel curve, and the controller determines, based on the selected curve dataset from the evaluator, a parameter associated with a worst-case execution time of the task by the processor to enable sizing of the processor of the embedded system.

2. The device as claimed in claim 1, in which the controller determines a size representing a number of measurements in the dataset, and wherein the variable input parameter provided to the selector by the controller is plurality of numbers are of the type 10*k, where k is a natural integer in a range between 1 and an integer part of the size divided by forty.

3. The device as claimed in claim 1, in which the evaluator calculates a scale factor and a localization factor for each curve dataset of the plurality of curve datasets.

4. The device as claimed in claim 3, in which the controller calculates an extremum from a function corresponding to an inverse probability of a distribution function extracted from the Gumbel curve defined by the form factor corresponding to a selected curve dataset of the plurality of curve datasets and by an associated scale factor and localization factor of the selected curve dataset.

5. The device as claimed in claim 4, in which the controller receives an input parameter and determines a probability based on the input parameter being a value or a value based on the input parameter being a probability based on the calculated extremum.

6. The device as claimed in claim 1, furthermore comprising:

an estimator to calculate a value representative of an expectation that a measurement from the dataset is greater than an input value received by the estimator, a sorter to generate, starting from the dataset representing measurements of execution times of a task by a processor of an embedded system and an input value received by the sorter from the controller, a data subset extracted from the dataset received by the sorter and whose associated measurements are greater than the input value received by the sorter, a second evaluator to calculate, starting from the data subset defining a distribution, a form factor indicating a probability of correspondence between the distribution defined by the data subset and a generalized Pareto distribution, the controller browses the dataset by increasing value of the measurements, each time the controller provides the sorter with the dataset and the input value received by the sorter, the controller also provides the estimator with the resulting data subset from the sorter and the input value received by the estimator, wherein the estimator 1) calculates a plurality of expectation values 2) analyzes the plurality of expectation values and 3) determines a stopping measurement from the dataset based on a curve formed by the plurality of expectation values exhibiting an inflexion, the controller further browses the dataset by increasing value of the measurements starting from a value associated with the stopping measurement, each time the controller provides the sorter with the dataset and the input value received by the sorter, the controller calls up also provides the second evaluator with the resulting plurality of data subsets, and the second evaluator selects the data subset whose form factor indicates a highest probability of correspondence between the data subset and the generalized Pareto distribution.

7. The device as claimed in claim 6, in which the second evaluator calculates a scale factor for each data subset.

8. The device as claimed in claim 7, in which the controller calculates a function corresponding to an inverse probability of a distribution function extracted from a Gumbel curve defined by the form factor corresponding to a selected data subset, by the associated scale factor for the selected data subset, and by a localization factor defined by the stopping measurement.

9. The device as claimed in claim 8, in which the controller receives an input parameter and determines a probability based on the input parameter being a value or a value based on the input parameter being a probability determined using the function.

10. The device as claimed in claim 5, in which the controller returns a greatest value or probability based on the calculated extremum.

* * * * *